US008949642B2

(12) United States Patent
Hoyer et al.

(10) Patent No.: US 8,949,642 B2
(45) Date of Patent: Feb. 3, 2015

(54) METHOD FOR DYNAMICALLY DISTRIBUTING ONE OR MORE SERVICES IN A NETWORK COMPRISING OF A PLURALITY OF COMPUTERS BY DERIVING A RESOURCE CAPACITY REQUIRED BASED ON A PAST CHRONOLOGICAL PROGRESSION OF A RESOURCE DEMAND

(75) Inventors: Marko Hoyer, Oldenburg (DE); Daniel Schlitt, Oldenburg (DE)

(73) Assignee: Offis e.V., Oldenburg (DE)

( * ) Notice: Subject to any disclaimer, the term of this patent is extended or adjusted under 35 U.S.C. 154(b) by 631 days.

(21) Appl. No.: 13/112,702

(22) Filed: May 20, 2011

(65) Prior Publication Data
US 2011/0289333 A1 Nov. 24, 2011

(30) Foreign Application Priority Data

May 21, 2010 (DE) .................. 10 2010 029 209

(51) Int. Cl.
*G06F 9/455* (2006.01)
*G06F 15/16* (2006.01)
*G06F 9/50* (2006.01)
(Continued)

(52) U.S. Cl.
CPC .............. *G06F 9/505* (2013.01); *G06F 15/173* (2013.01); *H04L 47/72* (2013.01)
USPC .............................. 713/323; 718/1; 718/104

(58) Field of Classification Search
CPC ...................................................... G06F 9/455
USPC ..................................... 713/323; 718/1, 104
See application file for complete search history.

(56) References Cited

U.S. PATENT DOCUMENTS

| 7,039,559 B2 | 5/2006 | Frohlich et al. |
| 7,350,186 B2 | 3/2008 | Coleman et al. |

(Continued)

FOREIGN PATENT DOCUMENTS

EP   1 469 387 A2   10/2004

OTHER PUBLICATIONS

B. Urgaonkar et al.: "Resource Overbooking and Application Profiling in Shared Hosting Platforms", Proceedings of the 5th Symposium in Operating Systems Design and Implementation (OSDI), vol. 36, 2002, pp. 239-254.
(Continued)

*Primary Examiner* — Mohammed Rehman
*Assistant Examiner* — Terrell Johnson
(74) *Attorney, Agent, or Firm* — Arent Fox LLP

(57) ABSTRACT

The invention relates to a method for dynamically distributing one or more services in a network comprised of a plurality of computers. According to certain aspects of the invention, a past chronological progression of a resource capacity required for a respective service according to a prescribed service requirement is derived from a past chronological progression of the resource demand for the respective service in a predetermined time interval. The past chronological progression of the resource capacity required for the respective service is then used to predict a chronological progression of the resource capacity required for the respective service. The services performed on the computers are finally distributed based on one or more optimization criteria, including that the respective computers provide enough resources for the services performed on the respective computers based on the predicted chronological progressions of the resource capacities required for the respective services.

16 Claims, 5 Drawing Sheets

(51) Int. Cl.
*G06F 15/173* (2006.01)
*H04L 12/911* (2013.01)

(56) References Cited

U.S. PATENT DOCUMENTS

| | | | |
|---|---|---|---|
| 7,783,759 B2* | 8/2010 | Eilam et al. | 709/226 |
| 7,925,757 B1* | 4/2011 | Rolia et al. | 709/226 |
| 2003/0115244 A1* | 6/2003 | Molloy et al. | 709/105 |
| 2003/0149685 A1* | 8/2003 | Trossman et al. | 707/2 |
| 2005/0278453 A1* | 12/2005 | Cherkasova | 709/231 |
| 2006/0053043 A1* | 3/2006 | Clarke | 705/8 |
| 2006/0184287 A1 | 8/2006 | Belady et al. | |
| 2008/0028409 A1* | 1/2008 | Cherkasova et al. | 718/104 |
| 2008/0271039 A1* | 10/2008 | Rolia et al. | 718/105 |
| 2008/0295096 A1* | 11/2008 | Beaty et al. | 718/1 |
| 2009/0113056 A1* | 4/2009 | Tameshige et al. | 709/226 |
| 2010/0100877 A1 | 4/2010 | Greene et al. | |
| 2010/0281285 A1* | 11/2010 | Blanding | 713/324 |
| 2010/0306163 A1* | 12/2010 | Beaty et al. | 706/52 |
| 2011/0072138 A1* | 3/2011 | Canturk et al. | 709/226 |

OTHER PUBLICATIONS

J. Shahabuddin et al.: "Stream packing: Resource Allocation in Web Server Farms with a QoS Guarantee", Lecture Notes in Computer Science (LNCS), Jan. 2001, pp. 182-191.

M. Hoyer et al.: "Statistical static capacity management in virtualized data centers supporting fine grained QoS specification", Proceedings of the Inter-national Conference of Energy-Efficient Computing and Networking (e-Energy), 2010.

* cited by examiner

_METHOD FOR DYNAMICALLY DISTRIBUTING ONE OR MORE SERVICES IN A NETWORK COMPRISING OF A PLURALITY OF COMPUTERS BY DERIVING A RESOURCE CAPACITY REQUIRED BASED ON A PAST CHRONOLOGICAL PROGRESSION OF A RESOURCE DEMAND_

CROSS-REFERENCE TO RELATED APPLICATIONS

This application claims the priority of German Application No. 10 2010 029 209.5-31, filed May 21, 2010, the entire specifications, claims and drawings of which are incorporated herein by reference.

BACKGROUND

1. Field

The present invention relates to a method for dynamically distributing one of more services in a network comprised of a plurality of computers, as well as to a corresponding computer network.

2. Introduction

A plurality of computing processes is executed in parallel on several computers in computer networks, for example those used at computing centers. Different computing processes are here executed in the form of services, for example in the form of so-called virtual machines, using the resources of the respective computers. These resources encompass the CPU time, I/O throughput (I/O=input/output), RAM load, and the like. To ensure that enough resources are available for performing the services to be performed in the computer network, corresponding service requirements are often stipulated, which frequently are also referred to as QoS requirements (QoS=quality of service). The distribution of services must here be selected in such a way that the services can be performed according to the QoS requirements.

Known from prior art for satisfying service requirements in computer networks are various methods for dynamic load and energy management, which suitably distribute the services to the computers, so that enough resources are provided for performing the services running on the respective computers at all times, if possible. Known methods are here often used to redistribute the services only based on the currently observed demand pattern for the services, and can hence frequently not respond in time to a changing demand pattern, so that occasional resource bottlenecks can be encountered, leading to uncontrollable, sharp declines in the performance of services.

Further known from prior art are predictive approaches, which attempt to predict future resource demand based on preceding load data from the computers in a computer network (for example, see U.S. Patent Application Publication No. 2006/0184287 A1). However, the predictions performed using the known methods are unable to guarantee that the service requirements of the respective services will actually be met.

SUMMARY

The invention, according to certain aspects, creates a method for dynamically distributing one or more services in a computer network that can reliably comply with the service requirements of the respective services.

In accordance with various aspects of the present invention, the method may be used for dynamically distributing one or more services for their execution in a network comprised of a plurality of computers. In step a) of the method, a past chronological progression of a resource capacity required for a respective service according to a prescribed service requirement to be satisfied for the respective service is derived for each service from a past chronological progression of the resource demand for the respective service in a predetermined time interval. The resource capacity at a point in time in the predetermined time interval is here determined in such a way as to statistically evaluate the chronological progression of the resource demand in a partial interval of the predetermined time interval, wherein the partial interval incorporates the point in time or lies adjacent to this point in time. The expression "adjacent to this point in time" must here be understood as meaning that, while the partial interval can in individual instances be slightly shifted relative to the point in time currently under consideration, the point in time should as a rule be incorporated in the partial interval. In particular, this point in time can mark the beginning or even the end of the partial interval. The performed statistical evaluation is then used as the basis for determining a resource capacity that satisfies the service requirement in the partial interval. This resource capacity is then the resource capacity required for the respective service at the point in time in the predetermined time interval. The concept of statistical evaluation must here be broadly interpreted, and includes any type of evaluation in which the plurality of resource demand values in the partial interval is used to derive statistical variables, e.g., maximum value, minimum value, frequency distribution and the like.

According to various aspects of the present invention, the past chronological progression of the resource capacity required for the respective service is used to predict a chronological progression of the resource capacity required for the respective service in a step b). As a result, this yields a predicted chronological progression of a required resource capacity for each service performed in the computer network. The services performed on the computer are then distributed based on one or more optimization criteria in a step c), wherein the optimization criterion or criteria encompass the criterion that the respective computer provides enough resources for the services performed on the respective computers based on the predicted chronological progressions of the resource capacities required for the respective services.

In accordance with various aspects of the present invention, the method may be characterized by a suitable modeling of a resource demand of services encountered in the past taking into account the corresponding service requirements. This makes it possible for the corresponding service requirements to also be suitably merged into the prediction of services, so that the services can be distributed to the computers in such a way as to always satisfy the service requirements during implementation of the method.

In accordance with yet other aspects of the present invention, the optimization criterion or criteria may include using the lowest possible number of computers for performing the services, wherein computers not being used to perform services are switched to an energy save mode. The concept underlying the energy save mode must here be broadly interpreted, and in particular also encompasses turning off the corresponding computer. The variant of the method just described makes it possible not just to satisfy service requirements, but further to greatly reduce the energy consumption in the computer network.

In accordance with various aspects of the present invention, the statistical evaluation performed in the method takes place in such a way as to use the past chronological progression of the resource demand in the partial interval to determine a histogram, and to derive from the histogram the resource capacity that satisfies the prescribed service requirement in the partial interval. In particular, the service requirement here establishes the frequency with which the resource demand must be less than or less than/equal to the resource capacity available on the respective computer. The resource capacity that satisfies the service requirement in the partial interval here corresponds to the resource demand in the histogram as reflected in the cumulative value for frequency according to the prescribed service requirement. If necessary, the prescribed service requirement can also stipulate that the resource demand cannot exceed the resource capacity available on the respective computer, wherein the resource capacity that satisfies the service requirement in the partial interval in this case corresponds to the maximum resource demand in the partial interval.

In accordance with yet other aspects of the present invention, a predominant or dominant period is determined from the past chronological progression of the resource capacity required for the respective service to predict the chronological progression of the resource capacity required for a respective service. The predetermined time interval is then divided into partial intervals with the length of the predominant period, wherein the predicted chronological progression of the resource capacity required for the respective service is determined for a future time interval with the length of the predominant period in such a way as to select the maximum resource capacity from the resource capacities at the same relative points in time in each partial interval, wherein the selected resource capacity corresponds to the resource capacity at the relative point in time in the future time interval. According to this embodiment, attention is focused on the fact that the resource demand in computer networks is as a rule subject to a predetermined, yet often unknown periodicity, for example based on a day, a week, or any other time periods, which is determined by the extraction of the predominant period. In a case where several dominant periods arise, the predominant period is preferably the one that exhibits the highest dominance based on a corresponding analysis (e.g., in the form of a corresponding peak). In an especially preferred variant, the predominant period is here determined via an autocorrelation analysis of the past chronological progression of the resource capacity required for the respective service. Methods for autocorrelation analysis are here sufficiently known from prior art, and will hence not be explained in detail at this juncture. These methods can be used to ascertain existing periodic repetitions in time series based on the determination of an autocorrelation function, wherein corresponding peaks arise in the autocorrelation function, and the peak with the greatest amplitude reflects the predominant period.

In accordance with various aspects of the present invention, the method may include determining the resource capacity at a past point in time at a current point in time by statistically evaluating the resource demand in the time interval that ends at the current point in time, and compared with the predicted resource capacity at the past point in time. The statistical evaluation here corresponds to the statistical evaluation according to step a). Finally, the future prediction of the chronological progression is adjusted to the past chronological progression of the resource capacity in such a way that resource capacities in the past chronological progression that are greater than the corresponding resource capacities in the predicted chronological progression replace the resource capacities in the future prediction. In this way, an unexpectedly changing resource demand is also suitably taken into account in the method. In an especially preferred variant, both step a) and step b) are here repeated if the number of resource capacities in the past chronological progression that are smaller than the corresponding resource capacities in the predicted chronological progression exceed a prescribed level. This ensures that the prediction model is adjusted accordingly given a prolonged deviation between the actual and predicted resource demand.

In accordance with various aspects of the present invention, the long-term trend of the chronological progression of the resource capacity required for the respective service can further be ascertained with known methods (e.g., the regression method). In this case, the chronological progression of the resource capacity required for the respective service is then predicted from the past chronological progression adjusted by the long-term trend. This always ensures a good prediction of the future required resource capacity.

In accordance with various aspects of the present invention, the services may be distributed in step c) in such a way that, taking into account the predicted chronological progressions of the resource capacities required for the respective services and the resource quantities available in the network, an attempt is made for a respectively running computer to shift the services on the respectively running computer to other running computers, so as to subsequently switch the computer into an energy save mode, and that, in the event of a resource bottleneck arising from the predicted chronological progressions of the resource capacities required for the respective services, an attempt is made to shift the services for clearing up the resource bottleneck in such a way as not to activate computers currently in the energy save mode. An especially energy-efficient operation of the computer network is achieved in this way.

In accordance with yet other aspects of the present invention, the method may be initialized with a secure distribution of services on the computers, wherein the secure distribution is configured in such a way as to guarantee that the resource demand of the services running on a respective computer according to the secure distribution will never cause the resource quantity provided by the respective computer to be exceeded, wherein the services on a computer according to the secure distribution represent secure services, and services migrated to another computer due to a redistribution represent insecure services. In an especially preferred embodiment, a redistribution of services is here only undertaken if a return from the redistribution into the secure distribution can be guaranteed. This variant ensures the ability to always return to a service distribution that ensures the secure performance of services in the computer network in a worst-case scenario.

In accordance with various aspects of the present invention, an insecure service may be described by a directed edge that extends from the computer on which this service is currently located to the computer on which this service was located according to the secure distribution. This creates a directed graph structure, in which the individual computers represent nodes, which if need be are interconnected by directed edges. Given the presence of such a distribution, the graph structure here consists only of nodes without any edges lying in between.

Based on the graph structure just described, a return from a redistribution to a secure distribution can be suitably guaranteed by virtue of the fact that a service can only be migrated from one computer to another if its migration does not yield any cycles in the directed graph structure. The special description here explains in greater detail how a suitable evaluation of the directed graph structure prevents cycles during service migration.

In order to guarantee a timely return to secure distribution in the event of a resource bottleneck, in accordance with various aspects of the present invention, for a redistribution of services to be performed involves taking into account the predicted chronological progressions of the resource capacities required for the respective services in a future time interval, which encompasses the required time for the redistribution of services and the required time for the return to the secure distribution from the redistribution. In cases where a computer can be switched to an energy save mode after the redistribution to be performed (i.e., if the computer performs no more services after the redistribution), this future time interval preferably contains a minimum period for the energy save mode. This takes into account the fact that switching a computer in an energy save mode, and in particular turning off a computer, only leads to an energy savings if the computer remains in the energy save mode or turned off for a minimum period of time.

According to yet other aspects of the present invention, when a distribution of services does not correspond to the secure distribution, the predicted chronological progressions of the resource capacities required for the respective services are monitored for a future time interval corresponding to the time period needed for returning to the secure distribution from the distribution. Given the threat of a resource bottleneck, this ensures that a timely return can still always be made to the secure distribution.

In accordance with various aspects of the present invention, a computer network consists of a plurality of computers, wherein the network encompasses one or more processing means, which are configured in such a way that the method according to the invention, and in particular one or more variants of the method according to the invention, can be implemented in the network. The one or several processing means are here as a rule filed in a computer in the computer network or distributed among several computers in the computer network.

It is understood that other aspects of the invention will become readily apparent to those skilled in the art from the following detailed description, wherein various aspects of the present invention are shown and described by way of illustration only. As will be understood, the present invention is capable of other and different variations and its several details are capable of modification in various other respects, all without departing from the scope of the invention. Accordingly, the drawings and detailed description are regarded as illustrative in nature and not as restrictive.

DETAILED DESCRIPTION

Figure 1:
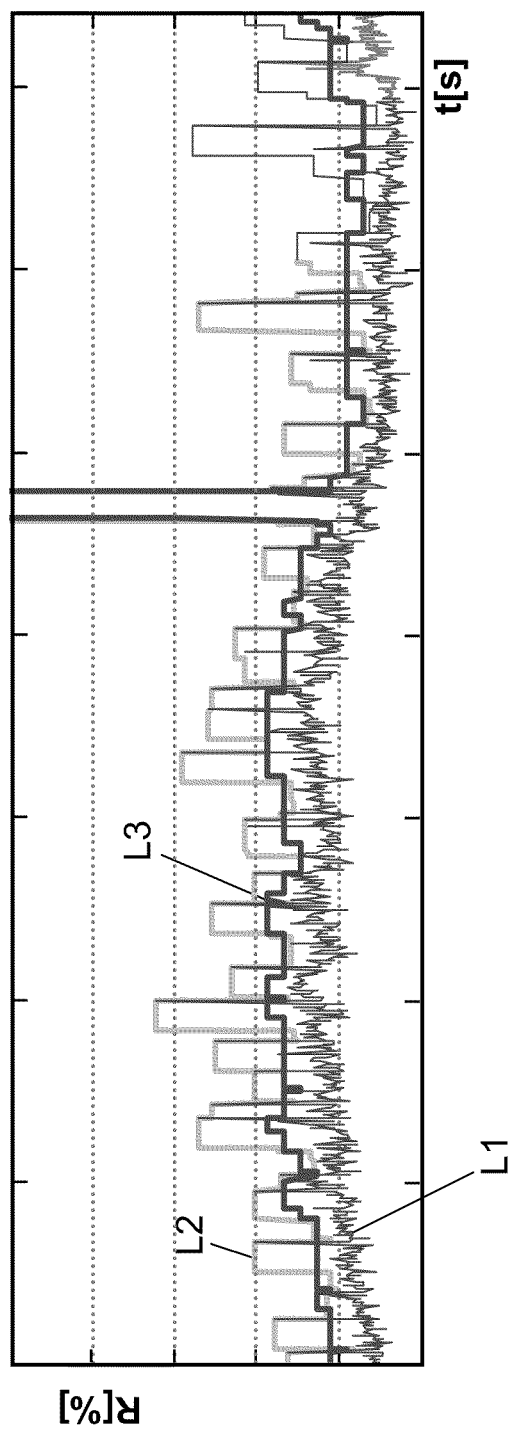
FIG. 1 is a diagram illustrating how the chronological progression of a resource capacity required in the past is determined from the chronological progression of the past resource demand of a service, in accordance with various aspects of the present invention.

In a network consisting of a plurality of computers or services of the kind conventionally used at computing centers, the following described embodiments of the invention enable a dynamic redistribution of the services performed on the computers, wherein a service is always performed on a single computer. For example, these services are realized as so-called virtual machines, which run on respective computers at the computing center, and can be shifted to other computers if needed. In order to ensure that a service is performed on a computer or satisfies the QoS criteria guaranteed by the computing center in relation to the service, one must ensure that the resource demand of a service has been adjusted to the resource capacity of the computer performing the service. A resource here generally represents the hardware and software provided for executing computing processes, and is usually reflected as a vector of different resource types, e.g., RAM, hard disk storage, CPU cycles in a time interval, I/O throughput (I/O=input/output) and the like. A resource demand or resource capacity for a service is represented below by a percentage value reflecting the utilization of the resources present in the computer network by the service. In addition, a single resource type is considered below without loss of generality, wherein the invention can be readily applied to a plurality of resource types.

Each service i running in the computer network exhibits a time-dependent resource demand, which is described below by the function $R_i(t)$. The computers in the network here provide corresponding resource capacities for the resource demand of a respective service. While the resource capacity of a computer is time-independent, various computers in the network can exhibit different resource capacities. In the following, the resource capacity of a computer k is also referred to as $C_k$.

According to aspects of the present invention, a past chronological progression of a resource demand $R_i(t)$ for a service i is used to determine the resource capacity $A_i(t)$ required for this service, which indicates for the past the quantity of resources that would have had to be provided for the service according to the past resource demand to satisfy a prescribed service requirement in the form of QoS criteria at point in time t. One essential aspect of the invention involves the method for determining the required resource capacity $A_i(t)$, according to which the one service requirement in the past is guaranteed. Based on the chronological progression of this past resource capacity $A_i(t)$ determined according to the invention, a suitable prediction method is then used to predict a future resource capacity required for the service, so that the QoS criteria remain valid in the future as well.

Based on the predicted required resource capacity $A_i(t)$, the services in the network of computers are finally redistributed in such a way as to keep the number of computers used to perform the services as low as possible. This requires a suitable allocation of the respective services i to performing computers k, wherein the allocation can change based on the resource requirements. The allocation can be expressed by the function B (i,t):i→k(t). Various services can be performed on the same computer, as long as the following equation is satisfied:

$$\forall k, t: \sum_{i:B(i,t)=k} A_i(t) \le C_k. \tag{1}$$

Various operations can be executed to achieve this. In particular, services can be shifted between the computers, i.e., migrated from one computer to another, the computers can be turned off, and then also reactivated again in the event of a rising resource demand. These operations are always linked with time delays, which are marked as $\Delta t_i^{mig}$ for the migration of a service, $\Delta t_k^{down}$ for powering down a computer, and $\Delta t_k^{up}$ for powering up a computer. While distributing the services, it is ensured according to the invention that the above equation (1) is satisfied at every point in time t.

In summation, the embodiment of the invention described below involves initially deriving a past resource capacity $A_i(t)$ required for a service i from a past resource demand $R_i(t)$. The derived resource capacity $A_i(t)$ is then used to predict the resource capacity required for the service for a future time period. The prediction method used in the process can reliably overestimate the expected resource demand in the future based on a periodic pattern of the resource demand. Finally, the services are subjected to an efficient, dynamic redistribution according to the expected resource demand, wherein this redistribution guarantees that a return can always be made to a so-called secure distribution of services. A secure distribution of services is characterized by the fact that the computer always provides an adequate resource capacity even given a maximum resource demand for the respective services on a computer, i.e., the resource capacity always exceeds the maximum resource demand for services on the computer. In the embodiment of the method according to the invention described here, this secure distribution represents the initial distribution of services at the start of the method. In the following, those services that run on a computer based on the secure distribution are referred to as secure services. A distribution that deviates from the secure distribution will also be referred to below as an insecure distribution. Similarly, a service that runs on a different computer than the computer specified according to the secured distribution will be designated as an insecure service.

The embodiment of the invention described here also involves calculating a planning timeframe that stipulates how long an insecure distribution of services generated by a redistribution must satisfy the demand for resources relative to all services. This planning timeframe must be dynamically determined as a function of the number of required migrations or required processes for powering down or powering up computers. The planning timeframe is required for deciding whether an insecure distribution to be achieved according to a redistribution also covers a future resource demand. Only if this is the case are the services switched to the insecure distribution.

FIG. 1 will be used to initially describe how a resource capacity $A_i(t)$ required for the past can be derived for the service from a resource demand $R_i(t)$ of a corresponding service i acquired in the past based on a prescribed service requirement. FIG. 1 here presents a diagram that shows time t on the X-axis and a percentage resource quantity in the computer network on the Y-axis. Line L1 shows the suitably acquired past resource demand $R_i(t)$ of a service i. As evident, this resource demand is very noisy. The noise is here random in terms of the data series, and hence difficult to model for predicting a future resource demand. According to the invention, the observed past time series $R_i(t)$ is now statistically smoothened, wherein the smoothening takes place in such a way that the smoothened time series $A_i(t)$ always reliably overestimates the actual resource demand based on the correspondingly stipulated service requirement. In other words, the smoothened time series $A_i(t)$ represents the resource capacity to be provided in the computer network for the service, so as to guarantee the corresponding service requirement according to the past resource demand. The smoothened time series $A_i(t)$ is then processed further to predict the future trend of the time series.

The embodiment described here involves determining a value $A_i(t)$ that indicates which resources must be reserved for the service at point in time t to cover the resource demand $R_i(t)$ in a subsequent time interval. In this case, the following formula is used to calculate the time series $A_i(t)$ from time series $R_i(t)$ for points in time t lying in the past:

$$A_i(t)=af(R_i([t,t+\Delta t_{avg}])) \tag{2}$$

af here represents an averaging function, which depends on how the required resources are to be determined from the corresponding time window $\Delta t_{avg}$ of the observed demand. In particular, the averaging function af depends on how the corresponding service requirement to be satisfied is defined in the form of a QoS requirement. On the one hand, FIG. 1 illustrates the calculated resource capacity $A_i(t)$ for a pessimistically determined service requirement with line L2. On the other hand, line L3 reflects the $A_i(t)$ for another QoS requirement known from prior art. All methods for determining the resource capacity in a corresponding time interval $\Delta t_{avg}$ are based on statistically evaluating the time series $R_i(t)$ in the time interval, and deriving a value for $A_i(t)$ via this evaluation. In order to calculate $A_i(t)$ for the pessimistic QoS requirement according to line L2, the statistical evaluation is based on determining the maximum resource demand max $(R_i([t,t+\Delta t_{avg}]))$ in the corresponding time interval $\Delta t_{avg}$, and having this maximum resource demand represent the value of $A_i(t)$. As a result, $A_i(t)$ satisfies the QoS requirement that the existing resource capacity always cover the resource demand as well.

As already mentioned, the statistical evaluation can also be performed based on other QoS requirements. In this case, the statistical evaluation as a rule takes place by using the time series $R_i(t)$ in interval $\Delta t_{avg}$ to generate a histogram that reflects the frequencies of the encountered values for the resource demand. For example, this histogram can then be used to derive a QoS requirement according to which the resource demand for a certain percentage of cases can exceed the resource capacity currently available in the computer. By cumulating the values on the histogram up to the percentage by which the resource demand must always lie below the capacity, the value of $A_i(t)$ can be determined by reading the resource value for the cumulated frequency value. According to the invention, any QoS specifications can be realized from a statistical evaluation. In particular, the statistical valuation makes it possible to derive the QoS specification described in "*Resource Overbooking and Application Profiling in Shared Hosting Platforms*", B. Urgaonkar et al., Proceedings of the 5th Symposium on Operating Systems Design and Implementation (OSDI), Vol. 36, 2002, pages 239 to 254 (hereinafter Urgaonkar) or "*Stream packing: Resource Allocation in Web Server Farms with a QoS Guarantee*", J. Shahabuddin et al., Lecture Notes in Computer Science (LNCS), January 2001, pages 182 to 191 (hereinafter Shahabuddin), which defines a quantity of required resources from a distribution by a prescribed quantile. In like manner, the statistical evaluation can be used to derive the QoS specification described in "*Statistical static capacity management in virtualized data centers supporting fine grained QoS specification*", M. Hoyer et al., Proceedings of the International Conference on Energy-Efficient Computing and Networking (e-Energy), 2010 (hereinafter Hoyer), which establishes a compromise between the quantity of resources provided and the performance in a fine-grained manner. In order to use the QoS specification from Urgaonkar, Shahabuddin, and Hoyer, this specification is now no longer applied to the entire time series of observed data, but rather only to the corresponding time interval $\Delta t_{avg}$, so as to in this way derive the time series $A_i(t)$ for the required capacity according to the above equation (2).

In a next step, the time series $A_i(t)$ from the past that was freed of noise is now used to derive a model for predicting this time series for the future, as will be described below based on FIG. 2. The model is derived using a known autocorrelation analysis, which is applied to the time series $A_i(t)$ determined in the past. Time series $A_i(t)$ is again depicted on FIG. 2 in a diagram D1 together with the originally noisy time series $R_i(t)$. The time series is subjected to an autocorrelation analysis, which is represented by AUT on FIG. 2. The following autocorrelation function r(s) was here used:

$$r(s) = \frac{1}{\Delta t_{A_i}} \int_0^{\Delta t_{A_i} - s} (A_i(t) - \overline{A}_i)(A_i(t+s) - \overline{A}_i)\, dt \quad (3)$$

$$\forall s: 0 \leq s \leq \Delta t_{A_i}.$$

This function describes the covariance of the overlapping part of the time series $A_i(t)$ and the same time series shifted by time interval s, specifically for each time interval between zero and the length of the entire time series, which is designed as $\Delta t_{Ai}$. $A_i$ is here the average value of $A_i(t)$ in interval $\Delta t_{A1}$. The result of the autocorrelation analysis is shown on FIG. 2 in diagram D2, which reflects the covariance r(s) as a function of the time shift s. As evident, the autocorrelation function r(s) exhibits a plurality of peaks, which get increasingly smaller as the time interval s rises. The peaks in the depicted correlogram here show the periodic pattern of the resource demands. Use is here made of the knowledge that a resource demand at a computing center is often subject to predetermined periodicities, with similar chronological progressions in resource demand arising in particular for time periods of days or possibly even one week or any other length of time desired, depending on the purposes for which the computing center is used. In the embodiment of the invention described here, continued use is made of the so-called smallest predominant period, which represents the time interval between the shift s=0 and time shift s when the highest peak arises. This smallest predominant period is marked with $p_{Ai}$ on FIG. 2. For example, if this predominant period is a period of one day, peaks not only arise during a time shift of one day, but also given a time shift of two, three and more days. However, since the overlap according to the autocorrelation function becomes increasingly smaller with a rising shift, the peak for a time shift of one day is the dominant one.

Figure 2:
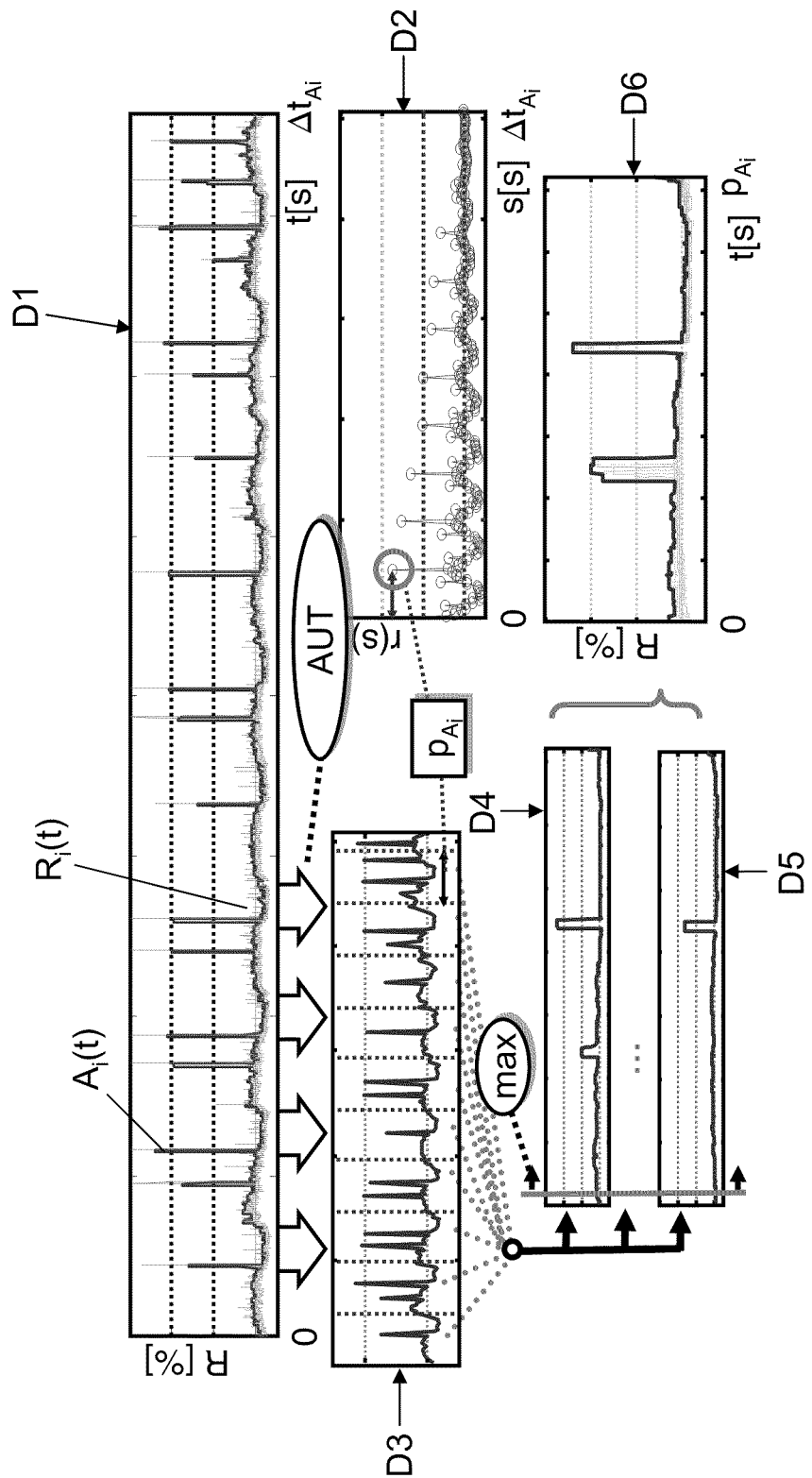
FIG. 2 is a schematic view showing how a future required resource capacity for a service is predicted as a function of the past chronological progression of the resource capacity determined on FIG. 1, in accordance with various aspects of the present invention.

In a next step also illustrated b the diagram D3 on FIG. 2, the time series $A_i(t)$ is now divided into individual intervals with the length of the predominant period $p_{Ai}$. Each of these intervals hence represents an instance of this period (e.g., a day). The prediction model is now derived from all instances by determining the maximum value of $A_i(t)$ for each point in time t in each instance, wherein this maximum value then represents the predicted value of $A_i(t)$ for a predicted time interval according to the length of the predominant period. This process is denoted in the lower section of FIG. 2. All sections $A_i(t)$ are here compared with the length of the predominant period at each point in time within the period, for example as reflected by two mixed diagrams D4 and D5, which represent respective parts of $A_i(t)$ from diagram D3. At each point in time, the maximum value is then determined from the parts of $A_i(t)$, as denoted by the designation "max" on FIG. 2. The maximum value for each point in time is finally recorded in a new diagram, which is labeled D6 on FIG. 2. This diagram represents the prediction model for the timeframe of a period $p_{Ai}$, wherein it is assumed that the period also continues for other future values with the same progression of the diagram D6, so that the required resource capacity $A_i(t)$ can be determined for any future points in time.

Depending on the length of the predominant period and the sampling rate at which the original chronological progression of the resource demand $R_i(t)$ was determined, the predicted time series according to diagram D6 can contain a large number of values. Based on the averaging performed during the determination of $A_i(t)$, sections of the sampled values exhibit nearly the same values. By combining the discretization of the time series with run length encoding, the storage complexity of the model along with the computing complexity can be greatly diminished, if the model is used for predicting the pattern of resource demand in the future.

The model just derived for predicting a future resource capacity required for a service assumes that no changes arise in the trend pattern for resource demand and in the noise pattern for resource demand. However, this assumption is not valid in specific instances. For example, an unexpected pattern of resource demand can arise in one instance of the predominant period, e.g., on a holiday during a workweek, wherein this pattern was not yet observed in the preceding time series. This poses no problem if the prediction model overestimates the actual demand in this case. However, if the actual demand is underestimated, performance problems might arise due to potential resource bottlenecks. In this case, the prediction model must be updated so as also allow for this unexpected scenario.

In a special variant of the method according to the invention, an unexpected demand on resources is taken into account by observing the pattern of resource demand for the duration of the method. At each point in time $t+\Delta t_{Ai}$, the required resource capacity for the timeframe between t and $t+\Delta t_{Ai}$ is determined according to the above equation (2), and compared with the corresponding prediction $A_i(t)$ at point in time t from diagram D6 on FIG. 2. If the determined resource capacity is higher than the one predicted, the model is updated at point in time t, specifically by having the value of the determined resource demand replace the corresponding value of the predicted resource demand.

It is also conceivable for the resource demand not to change unexpectedly, but rather for a continuous increase in resource demand to take place in the computer network, for example triggered by a rising number of clients using the corresponding services. These errors can also be detected in the same way as described above by comparing a determined resource demand with a predicted resource demand. However, the prediction errors crop up time and again owing to the continuous trend. In order to avoid this pattern, another embodiment of the method according to the invention involves individually modeling the long-term trend with known methods, for example with linear models, which are adjusted through regression. The prediction model is then applied to the past data, corrected by the long-term trend.

Under certain conditions, the predominant period or trend pattern can also change significantly. As described above, only a resource capacity that has been underestimated is corrected in such a case, while overestimated resource capacities are ignored. Depending on the scope of changes, then, there can be cases where the model is constantly upwardly adjusted, as a result of which the model in this instance just statistically predicts the maximum resource demand of a service at every point in time. Such models do not yield operations where energy is saved by turning off computers in the network. As a consequence, another variant of the method according to the invention involves determining when the predicted resource demand exceeds the actual resource demand. If such cases are frequently encountered, the entire prediction model is generated based on new data, as described for FIG. 1 and FIG. 2, wherein the new data relate to observations in the time interval that has chronologically just passed.

Described in the following are embodiments of the invention according to which a suitable resorting or redistribution of services on the computers of the computer network can be performed, so that computers can be turned off on the one hand to save energy, and potentially imminent resource bottlenecks can be averted on the other. It must here be ensured in particular that resorting has already concluded before the start of the imminent bottleneck.

The method for resorting initially proceeds from the secure distribution of services on the computers already mentioned above. A secure distribution is characterized by the fact that each service has enough resources at any time to sustain its prescribed response rate in the event of a maximum query load. A secure distribution of services can here be established with known static planning procedures, which determine the maximum resource demand of a service given an expected maximum query load via load tests, and hence plan an allocation of services to corresponding computers.

One objective of the dynamic resorting method described below is to proceed from the secure distribution in times of a low load and change over to a new distribution that requires fewer computers, which then can be switched into an energy save mode or turned off, thereby saving energy. The resorting method here ensures that there is a way back from a resorted distribution to the secure distribution at all times, and that this way back can also be taken in a timely fashion, before resource bottlenecks arise. According to the invention, then, a resorting only takes place if it can be guaranteed for resorting the services that a timely return can be made to the secure distribution, and if enough resources for the predicted resource capacity $A_i(t)$ are also present on the computers to which the services are shifted.

How the resorting algorithm can ensure a guaranteed way back to a secure distribution given a redistribution of services will first be described below. The establishment of suitable planning periods will then be described, based upon which the deactivation of computers via the redistribution of services and retention of insecure distributions is planned, in order to ensure in the process that a timely return can also always be made to the secure distribution.

Figure 3:
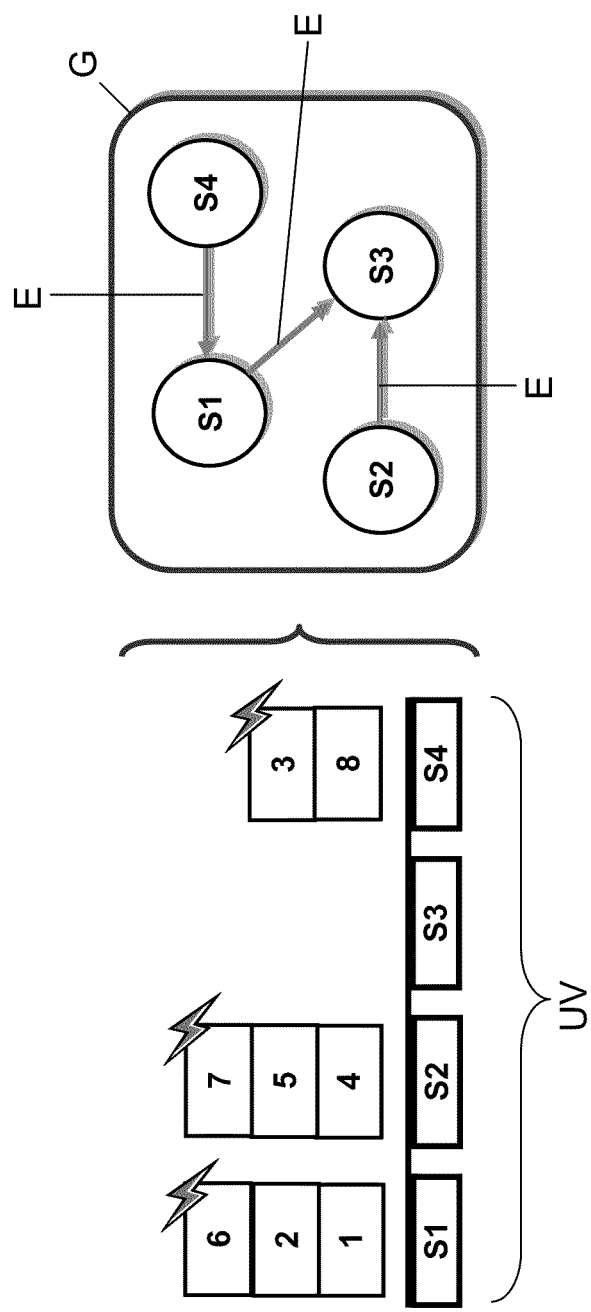
FIG. 3 is a schematic view depicting an exemplary scenario of how services are redistributed in a network comprised of several computers, in accordance with various aspects of the present invention.

In order to always ensure a reliable way out of an insecure distribution to the secure distribution, a directed graph G=(N, E) is defined, which describes the "safety status" of a distribution of services to the computers. The nodes N here represent the computers, and the edges E represent the path from the computer where a migrated, insecure service is located to the computer to which the service must be shifted, so that the latter again becomes a secure service. The right side of FIG. 3 presents a directed graph G for an insecure distribution as a example for a network consisting of four computers S1, S2, S3 and S4, which is represented by corresponding edges E between the nodes of the computers. The insecure distribution underlying the graphs is here shown in the left part of FIG. 3, and marked UV. The individual services distributed to the computers are denoted by reference numbers 1, 2, . . . , 7. As evident, services 1, 2 and 6 are located on computer S1, services 4, 5 and 7 are located on computer S2, no service is located on computer S3, and services 8 and 3 are located on computer S4. In this case, service 6 on computer S1 is an insecure service that belongs to computer S3 according to the secure distribution. In like manner, service 7 on computer S2 is an insecure service belonging to computer S3 according to the reliable distribution. Service 3 on computer S4 is also an insecure service, which belongs to computer 51 based on the secure distribution. All remaining services are secure services. The insecure services are illustrated on FIG. 3 by corresponding thunderbolts. If all services are now switched to the secure distribution according to edges E on FIG. 3, this yields a graph that then just contains nodes S1 to S4 without directed edges.

The description of insecure distributions based on directed graphs set forth just now will be used below to derive whether a return can also always be made to the secure distribution from an insecure distribution. It can here be established that, if a directed graph of an insecure distribution contains no cycles, a way back to the secure distribution always exists. This knowledge is used to ensure that no migrations of services into insecure distributions take place without a guaranteed return to the secure distribution.

The nodes without outgoing edges on FIG. 3, e.g., nodes S3, represent computers that contain only secure services. Therefore, insecure services that are secure on these computers can be moved back to these computers at any time. In this case, the corresponding incoming edge is removed. A non-cyclical graph contains no closed loops of directed edges. As a result, it is characterized in that all paths of any length emanating from a node (i.e., including paths from several edges extending over several nodes) always end in nodes that no longer encompass any outgoing edges. For example, such a path is the path from S4 to S3 in graph G on FIG. 3. Proceeding from the end of the path, all incoming edges of nodes can be removed by migrating the corresponding services back to the corresponding nodes. This in turn leads to other nodes along the path, which no longer exhibit any outgoing edges, so that their incoming edges can also be removed. Finally, all edges of all nodes can be removed via the recursive removal of edges from the paths. In the graph on FIG. 3, this is achieved for the path from S4 to S3 by first migrating service 6 to S3 and then service 3 to S1, thereby removing the edges between S1 and S3 or S4 and S1.

The recursive migration of services back to the secure distribution just described is only required in the worst-case scenario. If necessary, only a few services can be shifted as well, for example to alleviate arising resource bottlenecks. However, it must always be ensured before moving services that the graph continues to be non-cyclical after their movement, so that the complete, secure distribution of services can be reestablished again in the worst-case scenario.

Figure 4:
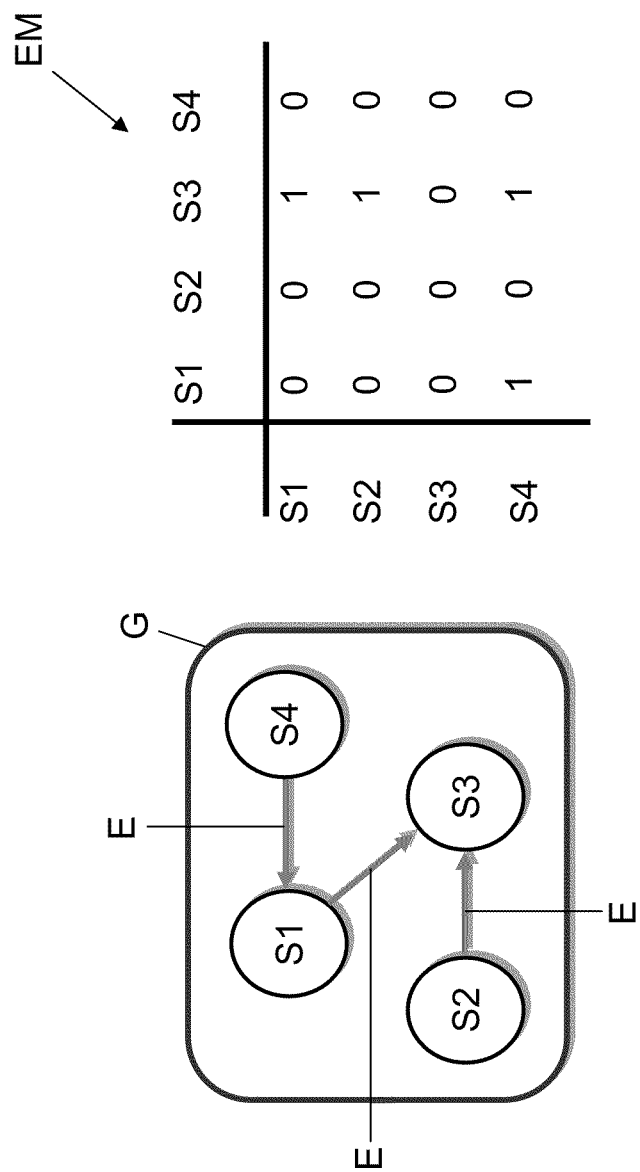
FIG. 4 is a view based on the scenario on FIG. 3, which shows an embodiment of how services are redistributed based on an achievability matrix, in accordance with various aspects of the present invention.

A description will initially be presented below of a variant of the invention according to which the criterion of non-cyclicality of the directed graph is checked by means of an achievability matrix given a migration of services. If a new edge is added between two computers due to the migration of a service, a cycle comes about precisely at the point when a path (of any length) is already present between the two computers in the opposite direction to the new edge. If such a path does not exist, the new edge can be added or the service can be migrated accordingly. In order to now determine whether an edge based on the cited criterion can be inserted, a directed graph is represented by a so-called achievability matrix. This is denoted on FIG. 4, which relates to the same graph G as FIG. 3. The right part of FIG. 4 here depicts the achievability matrix EM belonging to the graph G. The matrix has a line and column for each of the computers S1 to S4. The lines here represent the starting point of a path (of any length) in the graph, and the columns stand for the end of the path. Each element $e_{ij}$ of the matrix indicates the number of paths from a computer Si to a computer Sj. As may be gleaned from the achievability matrix, a path exists between computers S4 and S1. Further, a respective path exists between computers S1 and S3, S2 and S3 as well as S4 and S3.

If a new directed edge is to now be inserted between computer Sj (corresponding to the migration of the secure service on computer Sj to computer Si), the matrix element $e_{ji}$, is used to determine whether a path in the opposite direction already exists or not. If this element exhibits the value zero, the path does not exist. The new edge can be added if it does not already exist. After an edge has been added, the achievability matrix must finally still be suitably adjusted to the new distribution of services. This adjustment will be described below. If an edge with starting node Si and ending node Sj is added, all nodes achievable by j are also achievable by i by way of j. As a consequence, the elements of line j must be added for all matrix elements of line i. In addition, all nodes achievable via node Sj can also be achieved on all paths to node Si. For this reason, line j must be added up for all lines k having a number not equal to zero in column i. In addition, the new edge itself must still be entered into the matrix. To this end, the element $e_{ij}$ is increased by one. If an existing edge between nodes Si and Sj is to be deleted, the reverse procedure must be correspondingly followed. One is subtracted from element $e_{ij}$. All elements of line j must be subtracted from all lines k having a number in column i unequal to zero. In like manner, the elements of line j must be subtracted from all elements in lines i.

Within the framework of a dynamic resorting of services, the above algorithm based on an achievability matrix can now be used to determine possible operations for consolidating services on fewer computers and turn off the unused computers (i.e., computers that are not performing any services). As already mentioned, only those operations are permitted during the shifting of services that do not lead to cycles, and hence ensure that a way back to the secure distribution is always guaranteed. In the event of an imminent resource bottleneck detected by way of the prediction model for resource capacity described above, the achievability matrix can be used to initially attempt to resolve the conflict without reactivating additional computers. If this is unsuccessful, the computers must be reactivated, which allows the matrix the opportunity to perform additional operations. In the worst-case scenario, all computers are reactivated, and services are recursively sorted back based on the paths in the graphs. A realization as to how the planning algorithm checks operations for resorting services via the achievability matrix lies within the framework of expert activity, wherein suitable heuristics can be employed, for example, based on which various operations are performed for turning off computers or resorting services give resource bottlenecks.

A second variant will be described below with which cycles in the directed graphs can be prevented even without using the achievability matrix described above. This variant is less computing time-intensive than the variant according to the achievability matrix, and is based on permitting only a specific set of operations for shifting services, so as to ensure in this way that a non-cyclical graph is guarantied after the operations have been performed.

Figure 5:
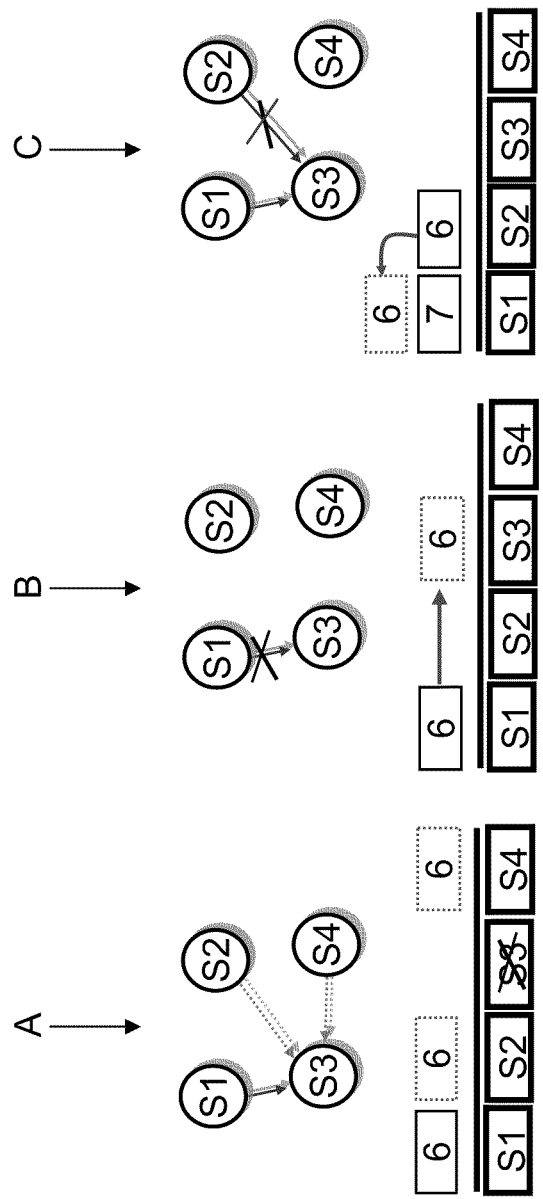
FIG. 5 is a schematic view depicting how services are redistributed based on prescribed permitted operations, in accordance with various aspects of the present invention.

Examined first are services whose original computers have been turned off according to the secure distribution. No services can be transferred to computers that are turned off, so that only incoming edges exist for such a computer. These edges belong to services that are secure on this (turned off) computer, and have been removed from the latter, so that the computer can remain turned off. As long as the computer remains turned off, these services can be shifted somewhere else in the network. This is denoted on FIG. 5 in scenario A. FIG. 5 again shows a network of four computers S1 to S4. In scenario A, server S3 is turned off, as denoted by a cross. Service 6 belongs to computer S3 according to the secure distribution, and has been transferred to computer S1, as denoted by the directed edge with the solid line. However, service 6 can also be transferred to computer S2 or computer S4, thereby generating the correspondingly depicted dashed edges. Since the node of computers S3 has no outgoing edges, this cannot lead to cycles in graphs.

Several restrictions must be observed for services that have been transferred to other computers, but whose original computer is still running according to the secure distribution. A secure operation that guarantees a return into the secure distribution always involves the shifting of insecure services back to the original computers according to the secure distribution, as denoted in scenario B on FIG. 5. In this scenario, the service 6 belonging to computer S3 according to the secure distribution has again been transferred to computer S1. Shifting the service 6 back to computer S3 here results in the removal of the corresponding edge between S1 and 3, so that this operation can never trigger a loop in the graph. Another way of having a service shift that does not lead to a cyclic graph involves shifting a transferred, insecure service to a computer that already contains other insecure services, which belong to the same original computer according to the secure distribution as the service that is being shifted. This is denoted in scenario C on FIG. 5, in which the insecure service 6 on computer S2 belongs to the original computer S3, and the insecure service 7 on computer S1 also belongs to the original computer S3. Shifting the service 6 from S2 to S1 removes the edge between S2 and S3. Since an edge already exists between S1 and S3 owing to the transfer of service 7, shifting the service 6 does not cause an edge to be added. As a consequence, no additional edges are generated, so that no cycles can arise during this operation either.

In summation, non-cyclical graphs are avoided in the second variant just described by only permitting the three operations described in the above passage while shifting services, wherein it can be guaranteed for these operations that no non-cyclical graph will arise, allowing a guaranteed transfer of the resultant insecure distributions back to a secure distribution again.

A special variant of a dynamic redistribution algorithm based on the permitted three operations described above will be outlined below. The objective here is to use as few computers as possible while performing services, so that the unused computers can be powered down, thereby saving on energy. In order to keep the number of unnecessary migrations low, services are moved in the variant described here only if at least one computer can be turned off or a redistribution of services is absolutely necessary due to an increasing resource demand. In order to turn off a computer, all services running on the computer at the time must be shifted to other computers. All secure services, i.e., those services that belong to the computer to be turned off according to the secure distribution, can be moved somewhere else based on the operation described above according to scenario A, since the computer is turned off once all services have been removed. All insecure services whose original computer according to the secured distribution is currently turned off can be treated in the same way. Restrictions apply only to the shifting of services whose original computer according to the secured distribution is still running. They can only be shifted by executing the operation according to scenario B described above, or the operation according to scenario C described above. If such a service can be shifted to different computers, conventional methods, such as the classic first-fit or best-fit heuristics, known as bin-packing algorithms, can be used to determine the best suited computer for transferring the service.

Services can be removed from a computer due to an increasing resource demand in an essentially similar way. Insecure services whose original computer according to the secure distribution has been turned off can be moved to any computers. Insecure services whose original computer according to the secure distribution is still running can be migrated based on operations according to scenarios B and C. Various heuristics can again be used to decide which of the services to move in order to counter an arising resource bottleneck, wherein an example of such heuristics will be described below.

If one or more services on a computer must be removed due to an increasing resource demand (determined with the prediction model described above), an attempt is first made to migrate services to other computers without reactivating an additional computer. Preference should be given to services that are already insecure, since moving services from a secure to an insecure position elevates the return path to a secure distribution by one increment. If no migration of services is possible without reactivating a computer, insecure services whose original computer according to the secure distribution has been turned off should be selected for migration purposes. After the computer for these services has been reactivated, the latter can be moved directly to the computer without the necessity of having to shift other services beforehand. If there are no insecure services with turned off computers, an insecure service whose original computer is running must be migrated to this computer. For this reason, other services that have been transferred to this computer must first be moved away, specifically with the same heuristic just described. In the worst-case scenario, this leads to a complete distribution back into the original secure distribution, in which each computer contains no insecure services.

The above passages described those measures that ensure that enough resources are available at all times to return an insecure distribution back to a secure distribution. However, the embodiment described here also takes into account time-related aspects, which ensure that a timely return can be made to a secure distribution before a resource bottleneck arises. To this end, a planning period is introduced, and designated as $\Delta t_{future}$. This planning period covers the timeframe required to return from an insecure distribution to the secure distribution, wherein the necessary reactivations of computers in the energy save mode as well as migrations of services are taken into account. An insecure distribution of services must be valid within the time period $\Delta t_{future}$, i.e., no resource bottlenecks can arise within this period of time based on the predicted resource capacities $A_i(t)$.

Proceeding from a secure distribution, $\Delta t_{future}$ is initially zero, since no time is required for returning back to the secure distribution. If a computer is to be deactivated to save energy, all services must initially be shifted. The computer is subsequently deactivated (i.e., turned off or switched to an energy save mode), which is followed by a phase in which the computer must remain deactivated for energy to be saved at all. This is because the energy needed to turn off and power up the computer exceeds the energy saved by turning off the computer if the deactivation time is too short. Given an increasing resource demand, the computer might have to be reactivated again, and, in the worst-case scenario, all services shifted back to the computer. This yields the following planning timeframe $\Delta t_{future}$, for which an insecure distribution generated by turning off the computer k must be valid based on the chronological prediction of the resource capacity for the respective services:

$$\Delta t_{future} = \sum_{i:B(i,t)=k} \Delta t_i^{mig} + \Delta t_k^{down} + t_{BE} + \Delta t_k^{up} + \sum_{i:B(i,t)=k} \Delta t_i^{mig}. \quad (4)$$

Time $\Delta t_i^{mig}$ is here the shifting time of service i. Times $\Delta t_k^{down}$ and $\Delta t_k^{up}$ are the deactivation or reactivation times of the computer k. Time $\Delta t_{BE}$ is the time necessary to save any energy at all.

After switching to an insecure distribution, the expected resource demand in the future must continue to be monitored to allow timely responses to changes. Proceeding from any insecure distribution of services to the computers, the following timeframe must remain monitored in the future:

$$\Delta t_{future} = \sum_{\substack{all\ deactivated \\ computers\ k}} \Delta t_k^{up} + \sum_{\substack{all\ insecure \\ services\ i}} \Delta t_i^{mig}.$$

If necessary, all deactivated computers have to be sequentially reactivated, which results in an overall reactivation time corresponding to the sum of all individual reactivation times. In addition, all insecure services must be moved back to their original computer according to the secured distribution, so that these services again become secure services. The non-cyclical graph described above, which was derived for the insecure distribution, can always be used to determine a way back to the secure distribution, so that each service i that is insecure only has to be shifted exactly one time. As a result, the overall migration time is the sum of migration times for all insecure services. In certain scenarios, the overall migration time can also be shorter. This holds true when migrations are running in parallel, for example as can be encountered in a computer network with different computer groups. Therefore, a shorter migration time can also be assumed depending on the infrastructure of the computer network. Since the validity of a current distribution is ensured during the planning timeframe, the predicted resource capacities arising directly after the planning period $\Delta t_{future}$ must be observed for all services. If the resource demand decreases, additional computers in the network can be turned off. In this case, the current planning period must be expanded by the period of time resulting from the above equation (4).

In the event of resource bottlenecks, the secure distribution need not always be completely established. In many instances, only a few services need to be shifted to other computers with the redistribution method according to the invention. Depending on whether the service is in a secure position or not, or whether the service is shifted into a secure position or not, the planning period for which the new distribution of services must be valid changes in a different way. If insecure services are moved to the original computer according to the reliable distribution, the planning period need not be lengthened, since the time for executing these operations has already been planned for the current distribution. In order to move an insecure service to a computer on which the service remains insecure, the new distribution of services must be checked for the current planning period, lengthened by the migration time required for the service. This must be done, since once a migration has been started, it can no longer be stopped until it has completely run its course. The same applies to services moved from a secure to an insecure position. In this case, the planning period must also be lengthened by the migration time of the service, since another insecure service exists after the migration, which in the worst-case scenario must be moved back in a timely manner before a resource bottleneck arises.

The embodiments of the invention described above exhibit a series of advantages. A method for dynamically distributing services in a network comprised of a plurality of computers is provided which, building upon a new type of prediction methodology, is able to guarantee that enough resources according to a prescribed service requirement are available to each service at all times. Comparably to previous approaches, the prediction mechanism used in the invention is based on the assumption of a constant noise and trend pattern, from which the expected resource demand for services can be predicted as far into the future as desired. However, as opposed to previous methods, the prediction is here guaranteed not to drop below the actual demand according to the service requirement, which is critical for ensuring resource guarantees. Given a violation of the precondition that the trend and noise pattern remain constant, a special variant of the method according to the invention provides an opportunity to correct for errors.

The method further encompasses a new type of resorting algorithm, which ensures that redistributions of services proceeding from a secure distribution are only performed if a timely return can always be made to the secure distribution before an arising demand leads to resource bottlenecks. In addition, the resorting algorithm can be used to ensure that no services run on several computers, so that these computers can be turned off. Based on estimates of the inventors, this makes it possible to save between 20 and 40% of the energy required at a computing center.

The resorting algorithm is characterized by the fact that it makes sure that enough resources are available at all times for reestablishing the secure distribution during the resorting process. Defined ways back from an insecure distribution are known before the secure distribution is exited, so that the necessary operations along the return path can already be used to estimate its duration. When using the prediction mechanism according to the invention, the estimate is important to ensure that the return can also be executed in time.

While the present invention has been described in connection with preferred aspects, it will be understood by those skilled in the art that variations and modifications of the preferred aspects described above may be made without departing from the scope of the invention. Other aspects will be apparent to those skilled in the art from a consideration of the specification or from a practice of the invention disclosed herein.

The invention claimed is:

1. A method for dynamically distributing one or more services in a network comprised of a plurality of computers, the method comprising:
   a) deriving a past chronological progression of a resource capacity required for a respective service according to a prescribed service requirement from a past chronological progression of a resource demand for the respective service in a predetermined time interval whereby, in order to determine the resource capacity at a point in time in the predetermined time interval, the chronological progression of the resource demand is statistically evaluated in a partial interval of the predetermined time interval by using the past chronological progression of the resource demand in the partial interval to determine a histogram, and deriving from the histogram the resource capacity that satisfies the prescribed service requirement in the partial interval, wherein the predetermined time interval contains the point in time or lies adjacent to this point in time;
   b) predicting a chronological progression of the resource capacity required for the respective service from the past chronological progression of the resource capacity required for the respective service;
   c) distributing, by a computer, the services performed on the computers based on one or more optimization criteria, wherein the optimization criterion or criteria includes that the respective computers provide enough resources for the services performed on the respective computers based on the predicted chronological progressions of the resource capacities required for the respective services;
   d) initializing a secure distribution of services on the computers, wherein the secure distribution is configured to guarantee that the resource demand of the services running on a respective computer according to the secure distribution will never cause a resource quantity provided by the respective computer to be exceeded, and wherein the services on a respective computer according to the secure distribution represent secure services, and services migrated to another computer due to a redistribution represent insecure services; and
   wherein an insecure service is described by a directed edge, which extends from the computer on which the insecure service is currently located to the computer on which the insecure service was located according to the secure distribution, thereby creating a directed graph structure.

2. The method according to claim 1, in which the optimization criterion or criteria includes using the lowest possible number of computers for performing the services, wherein computers not being used to perform services are switched to an energy save mode.

3. The method according to claim 1, wherein the prescribed service requirement establishes the frequency with which the resource demand must be less than or less than/equal to the resource capacity available on the respective computer, and wherein the resource capacity that satisfies the service requirement in the partial interval corresponds to the resource demand in the histogram as reflected in the cumulative value for frequency according to the prescribed service requirement.

4. The method according to claim 1, wherein the prescribed service requirement stipulates that the resource demand cannot exceed the resource capacity available on the respective computer, and wherein the resource capacity that satisfies the service requirement in the partial interval corresponds to the a maximum resource demand in the partial interval.

5. The method according to claim 1, further comprising:
   determining a predominant period from the past chronological progression of the resource capacity required for the respective service to predict the chronological progression of the resource capacity required for a respective service, after which the predetermined time interval is divided into partial intervals with the length of the predominant period, wherein the predicted chronological progression is determined for a future interval with the length of the predominant period in such a way as to select the maximum resource capacity from the resource capacities at the same relative points in time in each partial interval, wherein the selected resource capacity corresponds to the resource capacity at the relative point in time in the future interval.

6. The method according to claim 5, wherein the predominant period is determined via an autocorrelation analysis of the past chronological progression of the resource capacity required for the respective service.

7. The method according to claim 1, further comprising: determining the resource capacity from a past point in time at a current point in time by statistically evaluating the resource demand in the time interval that ends at the current point in time and comparing with the predicted resource capacity at the past point in time, wherein the statistical evaluation corresponds to the statistical evaluation according to step a) and wherein the future prediction of the chronological progression is adjusted to the past chronological progression of the resource capacity in such a way that resource capacities in the past chronological progression that are greater than the corresponding resource capacities in the predicted chronological progression replace the resource capacities in the future prediction, wherein steps a) and b) are preferably repeated if the number of resource capacities in the past chronological progression that are smaller than the corresponding resource capacities in the predicted chronological progression exceed a prescribed level.

8. The method according to claim 1, further comprising: ascertaining the long-term trend of the chronological progression of the resource capacity required for the respective service, wherein the chronological progression of the resource capacity required for the respective service is predicted from the past chronological progression adjusted by the long-term trend.

9. The method according to claim 1, wherein the services are distributed to take into account the predicted chronological progressions of the resource capacities required for the respective services and the resource quantities available in the network, and an attempt is made for a respectively running computer to shift the services on the respectively running computer to other running computers, so as to subsequently switch the computer into an energy save mode, and when a resource bottleneck arises from the predicted chronological progressions of the resource capacities required for the respective services, an attempt is made to shift the services for clearing up the resource bottleneck in such a way as not to activate computers in the energy save mode.

10. The method according to claim 1, wherein a redistribution of services is only performed if a return from the redistribution to the secure distribution can be guaranteed.

11. The method according to claim 10, wherein the return from the redistribution to secure distribution is guaranteed by a service that is only migrated from one computer to another computer if its migration does not yield any cycles in the directed graph structure.

12. The method according to claim 1, wherein the redistribution of services takes into account the predicted chronological progressions of the resource capacities required for the respective services in a future time interval, which encompasses the required time for the redistribution of services and the required time for the return to the secure distribution from the redistribution.

13. The method according to claim 12, wherein, if a computer can be switched to an energy save mode after the redistribution, the future time interval encompasses a minimum period for the energy save mode.

14. The method according to claim 1, wherein when a distribution of services does not correspond to the secure distribution, the predicted chronological progressions of the resource capacities required for the respective services are monitored for a future time interval corresponding to the time period needed for returning to the secure distribution from the distribution.

15. A computer network comprised of a plurality of computers, wherein the network encompasses one or more processing means configured to
   a) derive a past chronological progression of a resource capacity required for a respective service according to a prescribed service requirement from a past chronological progression of a resource demand for the respective service in a predetermined time interval whereby, in order to determine the resource capacity at a point in time in the predetermined time interval, the chronological progression of the resource demand is statistically evaluated in a partial interval of the predetermined time interval by using the past chronological progression of the resource demand in the partial interval to determine a histogram, and deriving from the histogram the resource capacity that satisfies the prescribed service requirement in the partial interval, wherein the predetermined time interval contains the point in time or lies adjacent to this point in time;
   b) predict a chronological progression of the resource capacity required for the respective service from the past chronological progression of the resource capacity required for the respective service;
   c) distribute the services performed on the computers based on one or more optimization criteria, wherein the optimization criterion or criteria includes that the respective computers provide enough resources for the services performed on the respective computers based on the predicted chronological progressions of the resource capacities required for the respective services;
   d) initialize a secure distribution of services on the computers, wherein the secure distribution is configured to guarantee that the resource demand of the services running on a respective computer according to the secure distribution will never cause a resource quantity provided by the respective computer to be exceeded, and wherein the services on a respective computer according to the secure distribution represent secure services, and services migrated to another computer due to a redistribution represent insecure services; and
   wherein an insecure service is described by a directed edge, which extends from the computer on which the insecure service is currently located to the computer on which the insecure service was located according to the secure distribution, thereby creating a directed graph structure.

16. The computer network of claim 15, wherein a predominant period is determined from the past chronological progression of the resource capacity required for the respective service to predict the chronological progression of the resource capacity required for a respective service, after which the predetermined time interval is divided into partial intervals with the length of the predominant period, wherein the predicted chronological progression is determined for a future interval with the length of the predominant period in such a way as to select a maximum resource capacity from the resource capacities at the same relative points in time in each partial interval, wherein the selected resource capacity corresponds to the resource capacity at the relative point in time in the future interval.

\* \* \* \* \*